Sept. 25, 1945. J. M. MORGAN 2,385,457
POWER TRANSMITTING MECHANISM
Original Filed Feb. 19, 1940   2 Sheets-Sheet 1

INVENTOR.
John M. Morgan
By
E. V. Hardway
ATTORNEY.

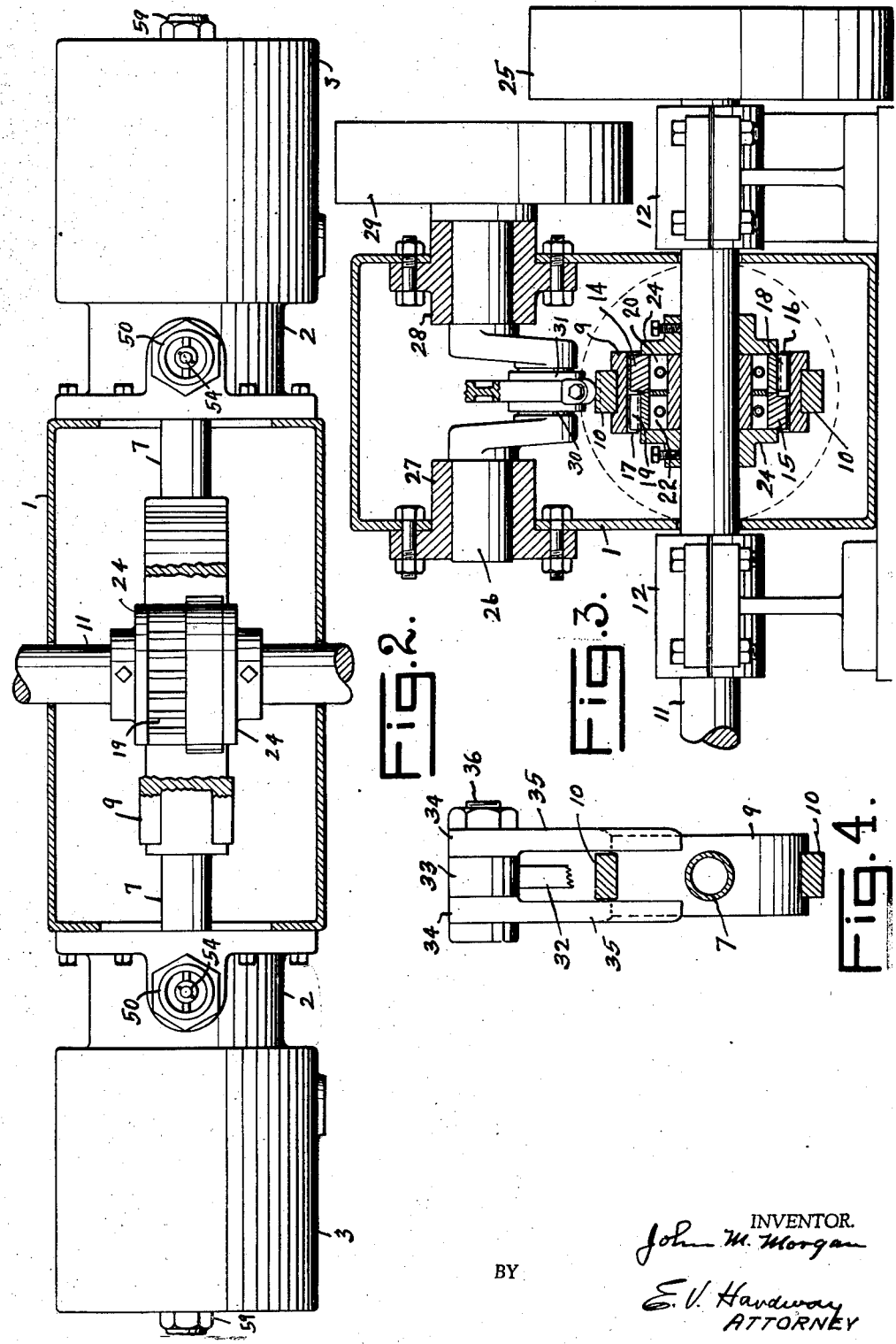

Patented Sept. 25, 1945

2,385,457

UNITED STATES PATENT OFFICE 2,385,457

POWER TRANSMITTING MECHANISM

John M. Morgan, Houston, Tex.

Original application February 19, 1940, Serial No. 319,634. Divided and this application March 16, 1943, Serial No. 479,390

2 Claims. (Cl. 74—132)

This invention relates to a power transmitting mechanism.

An object of the invention is to provide a novel connection between motor pistons and the power take-off shaft whereby the power will be delivered from the pistons to the shaft through the maximum leverage.

The invention also embodies novel means for positively limiting the range of movement of the motor pistons.

The present application constitutes a divisional application having been divided out of my copending application for Internal combustion motor, Serial Number 319,634, filed February 19, 1940 and issued under Patent Number 2,319,427.

With the above and other objects in view the invention has particular relation to certain novel figures of construction, operation and arrangement of parts, an example of which is given in this specification and illustrated in the accompanying drawings, wherein:

Figure 2 shows a plan view shown partly in section.

Figure 3 shows a cross-sectional view taken on the line 3—3 of Figure 1, and

Figure 4 shows a fragmentary, cross-sectional view taken on the line 4—4 of Figure 1.

Figure 1:
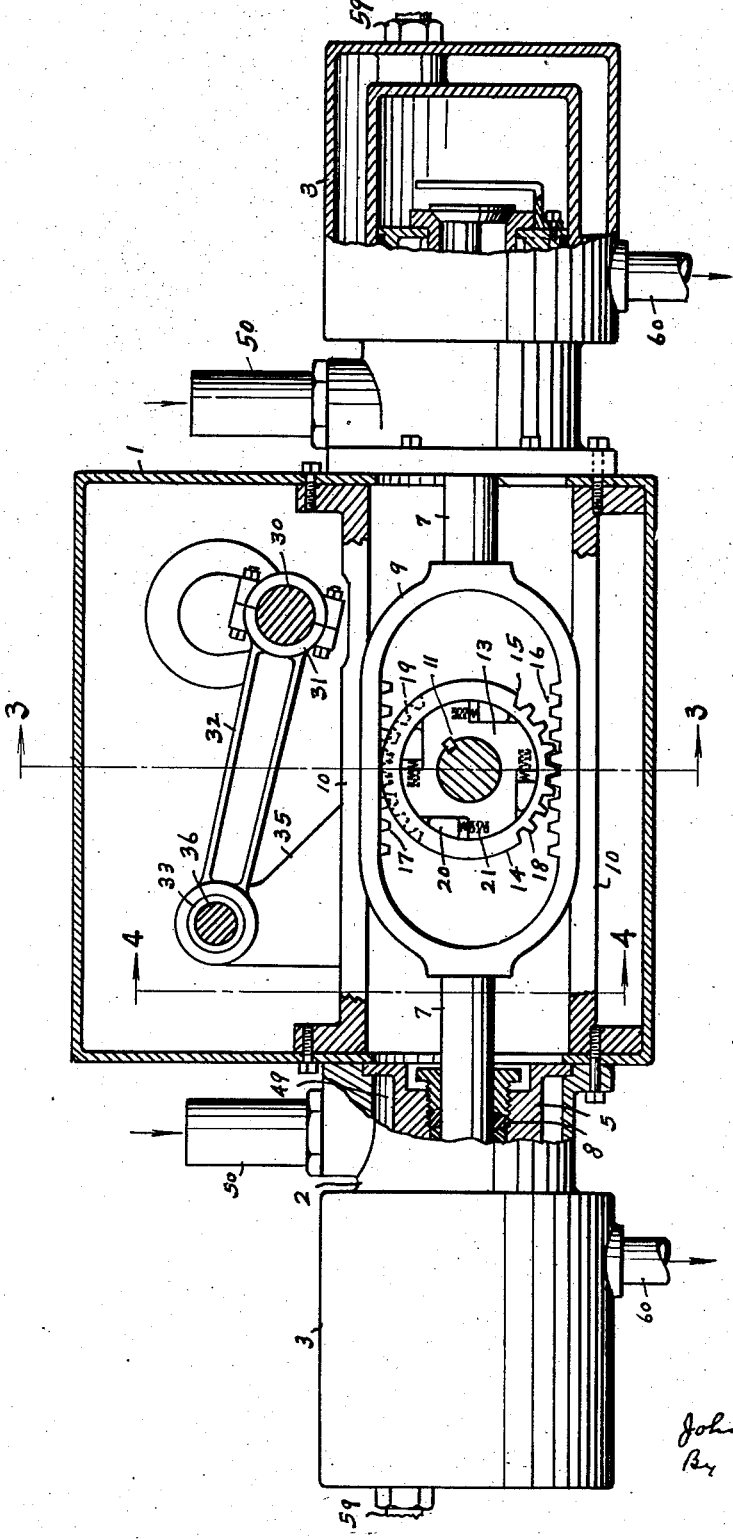
Figure 1 shows a side elevation of the motor shown partly in section.

Referring now more particularly to the drawings wherein like numerals of reference designate the same parts in each of the figures, the numeral 1 designates the motor case to opposite ends of which are bolted the cylinders 2, 2. These cylinders are preferably in axial alignment and have the water jackets 3 around them providing the water circulating chambers as 4.

Secured to opposite ends of the casing 1 are the stationary pistons 5, 5. The inner ends of these pistons have the external flanges 6, 6 which are clamped between the inner ends of the cylinders 2 and the adjacent ends of the casing 1 as shown in Figure 1. The hollow piston rods 7, 7 work through axial bearings in the stationary pistons 5 and are surrounded by the stuffing boxes 8, 8 which are mounted in the pistons 5. The inner ends of the piston rods 7 are attached to the corresponding ends of a substantially elliptical yoke 9 mounted in the casing 1 to move on the longitudinal tracks 10, 10 above and beneath said yoke, the ends of said tracks being anchored to the ends of the casing and the upper and lower sides of the yoke being provided with external, longitudinal grooves to receive said tracks as shown in Figure 3.

There is a power take-off shaft 11 mounted in suitable bearings 12, 12 and extending transversely through the case with its axis in a common plane with the axis of the piston rods 7, 7.

Keyed on the shaft 11 there is a clutch member 13 and fitted around this clutch member are the rings 14, 15. The opposite sides of the yoke 9 have the inside rack faces 16, 17 as more clearly shown in Figure 1. The periphery of the rings 14, 15 have the segmental gear teeth 18 and 19, respectively, which are in mesh with the corresponding rack faces 16, 17. Mounted in the periphery of the clutch member 13 within the ring 14 are the wedge-shaped clutch jaws 20 which are normally urged into frictional engagement with the inner side of the ring 14 by means of the pressure springs 21 and within the ring 15 there are similar wedge-shaped clutch jaws 22 which are similarly urged into frictional engagement with the ring 15 by the pressure springs 23. It will be noted that the series of jaws 20 are directed in the same direction as that of the clutch jaws 22. Accordingly, as the yoke 9 is operated in one direction, as for example, to the left the ring 14 will be turned in a clockwise direction and will be clutched by the jaws 20, with the clutch member 13 causing the shaft 11 to turn in the direction indicated by the arrow in Figure 1 or in a clockwise direction. During this movement, however, the clutch ring 15 will operate idly.

Upon reverse movement of the yoke 19, that is, upon its movement toward the right the ring 15 will be turned in a clockwise direction and will be clutched, by the jaws 22, with the clutch member 13 continuing the rotation of the shaft 11 in the same direction, the ring 14 during this reverse movement to the right being declutched and rotating idly. Thus as the piston rods 7 reciprocate a continuous rotation, in the same direction, will be imparted to the power take-off shaft 11. The ring and clutch assembly hereinabove described are maintained in assembled relation by the end flanges 24, 24 which abut the respective ends of said ring and clutch assembly and whose hubs surround and are secured to the power take-off shaft 11. This power take-off shaft may be equipped with a suitable momentum wheel 25 if desired.

There is a crank shaft 26 mounted to rotate in suitable transversely aligned bearings 27, 28, mounted in the side walls of the casing 7. One end of this crank shaft may be extended with a momentum wheel 29 fixed thereon.

The crank shaft 26 has an eccentric wrist pin 30 which works in the bearings 31 on one end of the connection rod 32. The other end of this connecting rod has a bearing 33 which is located between the bearings 34, 34 formed on the upper ends of the upwardly extended arms 35, 35 formed integrally with, or attached to, the yoke 9. A common cross-pin 36 is fitted through the aligned bearings 33, 34. The range of travel of the yoke and the pistons on the piston rods 7, is thus determined.

The drawings and description are illustrative merely, while the broad principle of the invention will be defined by the appended claims.

What I claim is:

1. An internal combustion motor comprising oppositely arranged cylinders, a shaft arranged perpendicular to the axis of the respective cylinders, pistons reciprocable in the cylinders, a yoke having rack faces, piston rods connected to the yoke and to the respective pistons, means operatively connecting the yoke with said shaft and effective to transmit rotation in a constant direction to the shaft as the pistons reciprocate, a crank shaft mounted to rotate on the motor and having an eccentric wrist, a connecting rod one end of which has a bearing on said wrist and means for connecting the other end of the connecting rod with the yoke.

2. An internal combustion motor comprising oppositely arranged cylinders, pistons reciprocable in the cylinders, a yoke having rack faces, piston rods connected to the yoke and to the respective pistons, means operatively connecting the yoke with said shaft and effective to transmit rotation in a constant direction to the shaft as the pistons reciprocate, a crank shaft mounted to rotate on the motor and having an eccentric wrist, a connecting rod one end of which has a bearing on said wrist, an upstanding arm on the yoke to which the other end of the connecting rod is connected.

JOHN M. MORGAN.